March 30, 1965    G. R. SÄFLUND ETAL    3,175,539
ELECTRIC LEAD AND PENCIL SHARPENER
Filed Oct. 16, 1961    3 Sheets-Sheet 3
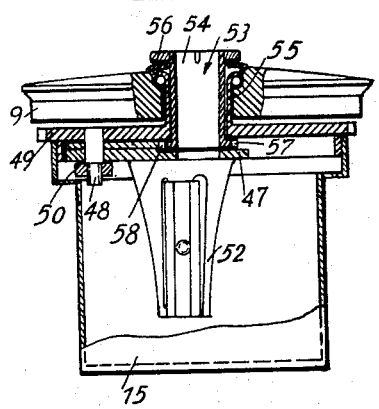
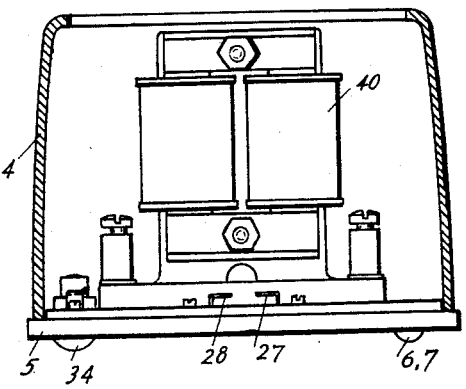
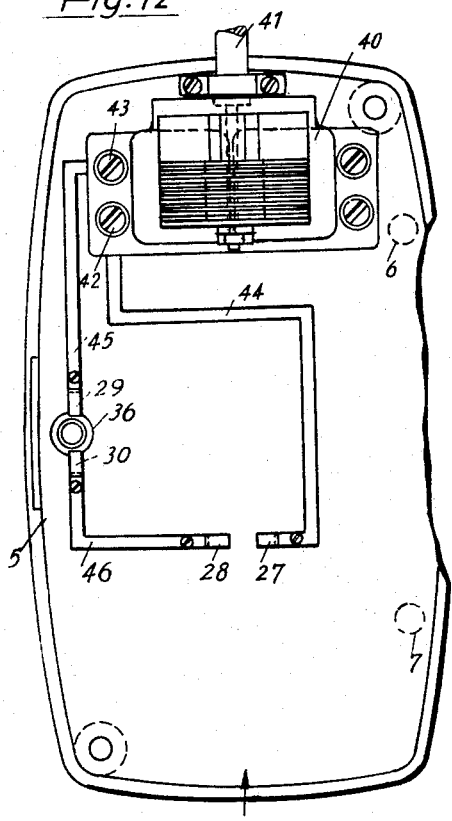
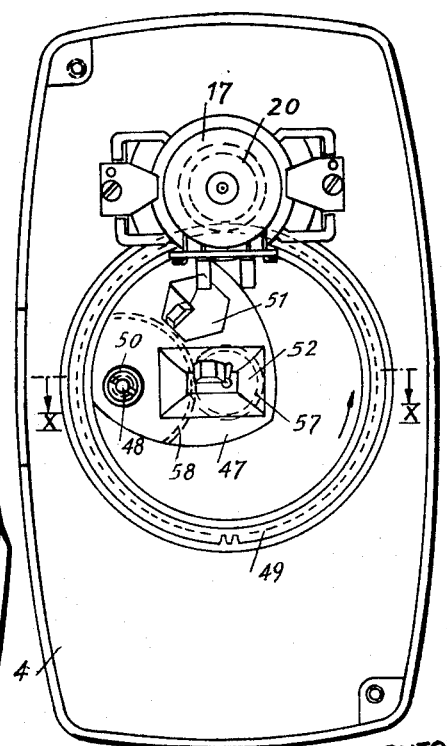
INVENTORS
GÖTE RAGNAR SÄFLUND
JOSEF SCHWARZAEUGL
By Otto John Munz
Attorney United States Patent Office 3,175,539
Patented Mar. 30, 1965

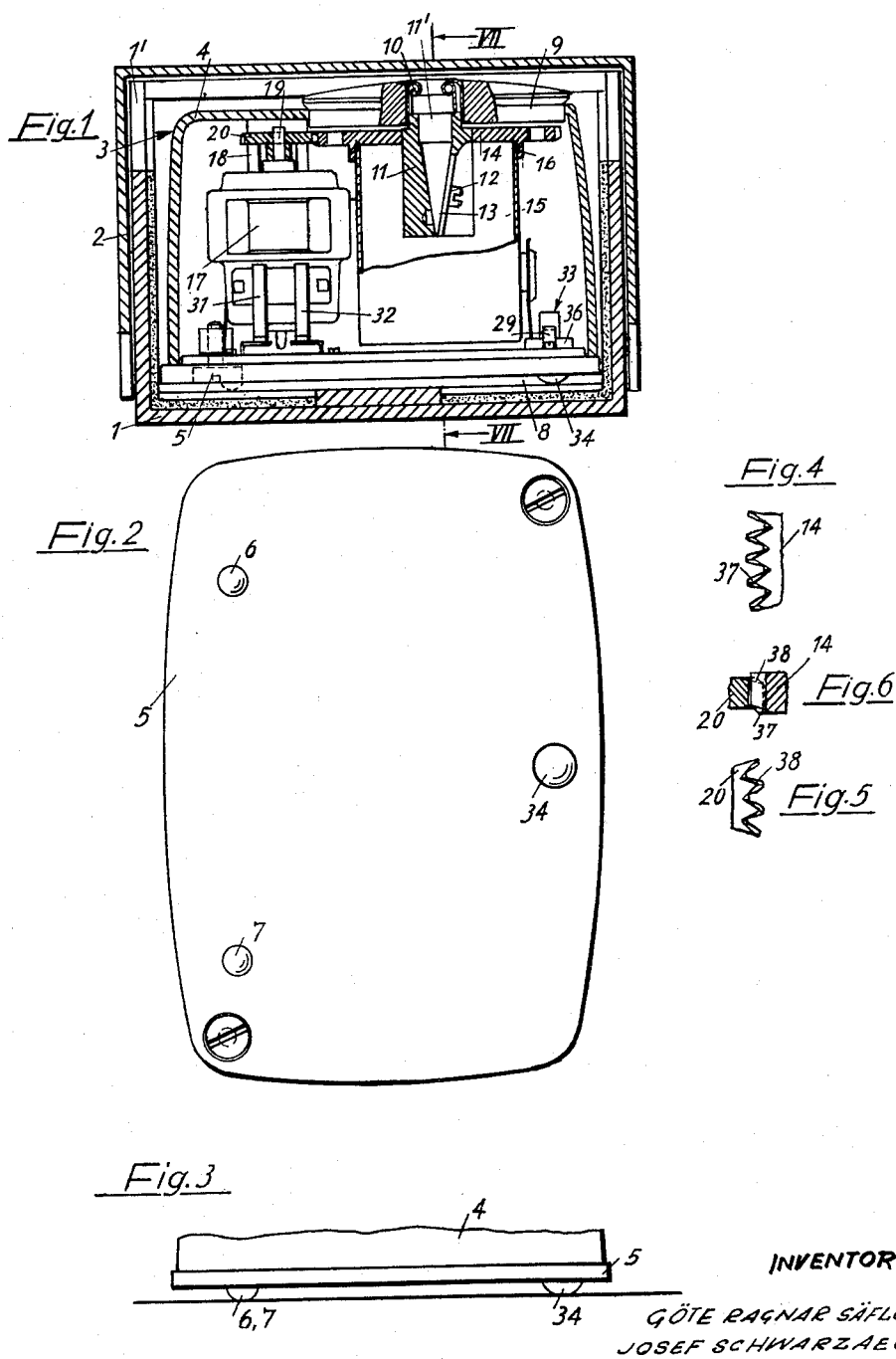

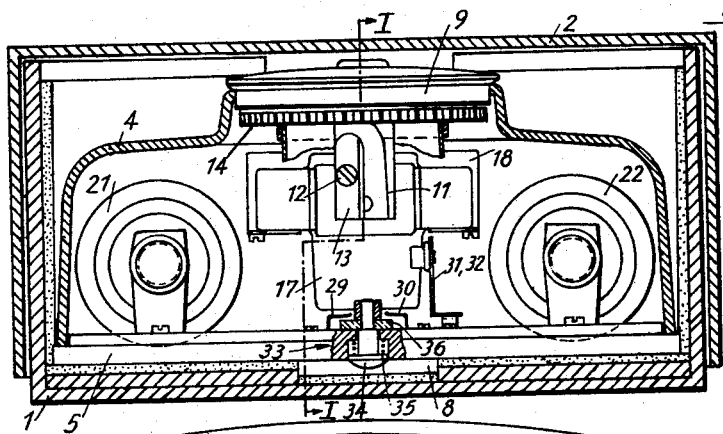
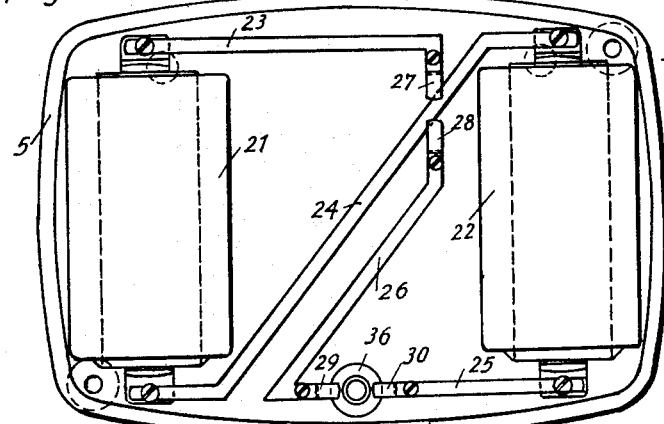
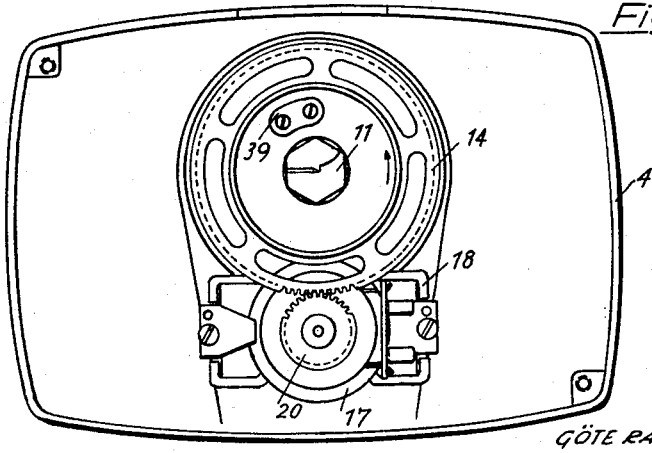

3,175,539
ELECTRIC LEAD AND PENCIL SHARPENER
Göte Ragnar Säflund, Sollentuna, near Stockholm, Sweden, and Josef Schwarzäugl, Stein, near Nurnberg, Germany, assignors to A. W. Faber-Castell, Stein, near Nurnberg, Germany, a firm of Germany
Filed Oct. 16, 1961, Ser. No. 145,233
Claims priority, application Germany, Oct. 18, 1960, F 32,361
5 Claims. (Cl. 120—96)

The present invention relates to a lead and pencil sharpener driven by an electric motor which runs on a battery current or a line current.

The apparatus of the prior art are driven directly by an electric motor at the speed of its rotor. This causes serious problems when conventional high speed motors are employed since the sharpening units run too fast, especially for sharpening leads. Also, the high speed of the lead sharpener often results in difficulties and breakdowns. Special slow-running motors are more expensive than high speed motors and their use increases the cost of the entire sharpener to a prohibitive value.

It is an object of the present invention to provide a pencil or lead sharpener employing paring blades driven by a normal high speed motor.

This and various other objects, features, and advantages of the present invention will become more clearly apparent from the following detailed description and drawings, in which—

FIGURE 1 shows a vertical section taken along line I—I of FIGURE 7 of a preferred embodiment of the invention;

FIGURE 2 shows a bottom view of the apparatus shown in FIGURE 1;

FIGURE 3 shows an end view of the apparatus of FIGURE 2;

FIGURE 4 shows a perspective view of a portion of the apparatus of the invention;

FIGURE 5 shows a perspective view of another portion of the apparatus of the invention;

FIGURE 6 shows a sectional view of a portion of the apparatus;

FIGURE 7 shows a cross section taken along line VII—VII of FIGURE 1;

FIGURE 8 shows a plan view of the base of the apparatus with the upper part of the housing removed;

FIGURE 9 shows a view of the inside of the upper part of the housing of the apparatus of the invention;

FIGURE 10 shows a partial cross section taken along line X—X of FIGURE 13 showing additional features which may be incorporated into the sharpener of the present invention;

FIGURE 11 shows an end view of the apparatus of the invention, partly in section, as seen in the direction of the arrow in FIGURE 12;

FIGURE 12 shows a top view of the base of the apparatus of the invention;

FIGURE 13 shows a view of the inside of the upper part of the housing of the apparatus of the invention.

Referring now to the drawings wherein like reference characters designate like corresponding parts throughout the several views, the sharpening apparatus 3 when not in use is intended to be stored within a mating box with a lower part 1 and a cover 2, as shown in FIGURES 1 and 7. The lower part 1 of this box is provided with a recess 8 in the upper side of its bottom and with apertures 1' in its side walls. The several parts of the sharpening apparatus 3 are enclosed within a housing and mounted on the upper part 4 and the base 5 thereof.

The sharpener is provided with a contact member 34 on the base of the housing which, when the machine is not in operation, slightly projects below the base and which may be depressed against spring action toward or into the base by the downward pressure of the insertion of the pencil. When so depressed, this contact member actuates the switch which closes the motor circuit and thus starts the motor. This contact member may form a part of the switch and serve simultaneously as a pushbutton of a pushbutton switch and as one leg of a tripod. The switch is therefore actuated solely by the axial pressure of the inserted pencil or lead holder, and no pressure is exerted upon the pencil or holder in a radial direction thereof which might be detrimental to the sharpening process.

The lower side of base 5 is provided with three legs 6, 7, and 34 in a triangular arrangement, as shown in FIGURE 2, for supporting the machine in a steady position. The upper part or casing 4 of the housing has a large aperture into which a cover 9 is inserted. This cover 9 supports a cutter head 11 which is rotatably mounted therein by a ball bearing 10. The ball bearing forms a frictionally engaging orifice for the pencil as it is being inserted therethrough. Cutterhead 11 carries a cutting blade 13 which is removably secured thereto by a screw 12.

A speed reduction gear 14 is interposed between the motor and the cutter head carrying a paring blade or blades. Thus, the sharpening device itself runs at a lower speed than the rotor of the electric motor. This results in several additional very important advantages. The sharpener may be rotatably mounted in the cover which is removably inserted into the housing. This cover may also serve as a support of the chip container which surrounds the cutter head or cutter heads. In this manner it is easily possible to remove the chip container when it has to be emptied.

In order to incur the least possible resistance in the rotation of the cutter head, the same is rotatably mounted in the cover by means of a ball bearing. For driving the cutter head, the same is rigidly secured to a gear which meshes with a pinion which is secured to the shaft of the motor. By such a provision of a speed reduction gear, it is possible to employ a high speed motor which may be small and inexpensive. Cutter head 11 is also rigidly secured to a gear 14 which has a cylindrical flange 16 into which the upper end of a chip container 15 is tightly fitted, so as to be clamped thereby.

The embodiment shown in FIGURES 10 to 13 inclusive has the same basic features. The same type housing 5 is equipped with three legs 6, 7 and 34 arranged in a symmetrical triangle and serving as a tripod; the leg 34 functions as a circuit maker on depression thereof. The pencil inserted through the orifice 54 passes in frictional engagement the ball bearing 10, thus overcoming the spring force 35 to energize the motor drive prior to the actual engagement of the pencil point with the cutter head 52 or 53.

The upper part 4 of the housing as shown in FIG. 1 further contains an electric motor 17 which is secured thereto by brackets 18 and has a shaft 19 on the upper end of which a pinion 20 is mounted.

The upper wall of the housing has a large aperture into which the cover 9 which carries the cutter heads is inserted. Since the motor and the cover are connected to the same part and closely adjacent to each other, it is easily possible to maintain a certain distance between the axis of rotation of the cutter head and that of the motor. This is of considerable importance for a proper meshing engagement between the pinion and gear.

The gear is further employed for removably securing a chip container thereon by a clamping action. This container is designed so as to surround completely the cutter head or cutter heads. Thus, no chips or graphite or crayon particles can enter the inside of the machine. If the chip container is to be emptied, the cover with the gear and the clamped-on chip container thereon is withdrawn from the machine housing.

The motor of the machine may be powered either by batteries or by line current. If it is built to run on batteries, they may be mounted within the machine housing and preferably horizontally on its base at the left and right of the motor. This type of construction reduces the height of the machine and also increases its stability and steadiness on its supporting surface, also because the machine then has a low center of gravity. In order to permit the machine to be connected to the line current, it is also possible to provde a transformer within the machine housing. The transformer may be provided either in addition to or in place of the batteries. A very simple electric connection between the batteries or the transformer and the motor and its switch may be attained by means of sheet-metal connecting strips which are secured to the base of the machine, that is, to the bottom of the housing. These metal strips also serve as contacts or contact springs which are formed by bending the strips at suitable angles. Two of these contacts are associated with corresponding contacts on the motor and provide for the current supply to the motor. The ends of two other connecting strips form the contacts of the pushbutton switch.

As shown in FIGURES 7 and 8, electric batteries 21 and 22 are mounted on the base 5 at both sides of motor 17 and they are connected to sheet-metal strips 23, 24, and 25. The strip 24 connects the batteries in series and a further metal strip 26 is provided between two other strips 23 and 25. The free ends of strips 23, 25 and 26 are bent over and form resilient electric contacts 27, 28, 29 and 30. The two contacts 27 and 28 are associated with contact springs 31 and 32 which are mounted on the motor to supply the latter with current. Contacts 29 and 30 may be connected by means of a pushbutton switch 33 which is mounted on base 5. The switch has a pushbutton 34 which is kept open downwardly by a spring 35, and a contact disk 36 wich is secured to pushbutton 34.

The switch may be still more easily actuated by providing the inlet opening for the pencil or lead holder eccentrically to the switch. In order to prevent the machine from sliding along a table or other support while a pencil or lead holder is being inserted, the feet of the machine may be made of rubber. It is still more effective for this purpose, if at least one of the feet is made in the form of a suction cup.

Since the cover carrying the cutter head, the gear and the chip container should be removable from the machine to permit the chip container to be emptied, it would ordinarily be difficult to reengage the gear with the pinion on the motor shaft when the cover with the mentioned elements is reinserted. Such a reengagement will be easily possible by making the teeth of the gear and pinion of an inclined shape at the sides facing toward each other during the reengagement.

As illustrated in FIGURES 4, 5 and 6, the teeth 37 of gear 14 and the teeth 38 of pinion 20 are both inclined at one side, that is at the sides facing each other when gear 14 is being inserted. Gear 14 further carries a counterweight 39, as shown in FIGURE 9.

The operation of the sharpener machine according to FIGURES 1 to 9 is as follows:

A pencil which is to be sharpened is inserted through the opening 11' in the cutter head 11 whereby it engages first the ball bearing 10. Immediately a vertical downward pressure is exerted upon the sharpener whereby the pushbutton 34 which also serves as a leg of the housing is depressed against the action of spring 35. Contact disk 36 is thereby moved into engagement with contacts 29 and 30 so that the circuit of the batteries and the motor is closed. Shaft 19 of motor 17 then starts to rotate and to drive the cutter head 11 through the gears 20 and 14. By the time it acquires maximum speed, the pencil lead passes through opening 11' and becomes seated in the cutter head. Since the pencil is held without turning, it is then sharpened by the revolving cutter head. When the sharpening operation is completed the pencil is withdrawn from the opening 11'. Since the downward pressure upon the machine is then also discontinued spring 35 pushes the pushbutton 34 again downwardly whereby the circuit of the batteries and the motor is broken and the motor is stopped.

When the machine is placed into the box 1, pushbutton 34 lies within the recess 8 in the bottom thereof and is thus prevented from being depressed while the machine is stored within its box. By the provision of the apertures 1' in the side walls of the box, the machine can be easily gripped at its upper end and withdrawn from the box.

The sharpener illustrated in FIGURES 10 to 13 uses a transformer 40 which may be connected by a cable 41 to the public current supply. Metal strips 44 and 45 are secured to the terminals 42 and 43 of transformer 40, while a further metal strip 46 forms connecting contacts 28 and 30 for the same purpose as described with reference to the embodiment according to FIGURES 1 to 9.

To permit sharpening of pencils as well as of leads, the sharpener gear may be provided with a tubular extension which is rotatably mounted in the cover, and the combined pencil and lead sharpener may then be secured to the gear. This combined pencil and lead sharpening device may consist of a pivotable arm which is preferably plate-shaped and carries two cutter heads, that is, one for sharpening leads and the other for sharpening pencils. The lead and pencil inlet openings in the two cutter heads may be alternately aligned with the main inlet opening in the cover by pivoting the arm carrying the cutter heads about its axis to one or another position. A setting device for pivoting the arm may be formed, for example, by providing the main inlet opening in the cover in a bushing which extends through the cover and carries on its outer end a setting wheel or rim. On its inner end, this bushing carries a pinion which meshes with a gear segment which is secured to the pivotable arm carrying the cutter heads. By turning the setting wheel, it is possible to pivot the arm from one of its operating positions to the other in which the inlet opening of one or the other cutter head is in alignment with the main inlet opening in the cover. Suitable means are preferably provided for arresting the pivotable arm in either of its two operating positions.

Since due to the weight of the cutter heads and their pivoting means, the gear is unbalanced, a counterweight is preferably provided on the gear to compensate the unbalance and to insure a smooth running of the machine.

The sharpener according to FIGURES 10 to 13 shows this additional improvement in that it is provided with a device for selectively sharpening either wooden pencils or leads. A flat plate 47 of a spherical triangular shape is seen in a plan view in FIG. 13. This plate 47 is pivotably mounted on a pin 48 which is inserted with a force fit into a gear 49. Plate 47 which is held on pin 48 by a nut 50 carries a cutter head 51 for sharpening leads and another cutter head 52 for sharpening pencils. By pivoting plate 47 in one direction or the other, the inlet openings of cutter heads 51 and 52 may be brought into alignment with the main opening 53. This opening 53 is provided in a bushing 54 which extends through a tubular extension 55 of gear 49 and carries on its outer end a knurled wheel or rim 56, while its inner end carries a pinion 57 which is in mesh with a gear segment 58 which is mounted on the pivotable plate 47.

The operation of the sharpener according to FIGURES 10 to 13 is as follows:

The starting and stopping operation occurs in the same manner as in accordance with FIGURES 1 to 9 and it is therefore only necessary to describe the function of the means for adjusting the pivotable plate 47. By turning the knurled rim 56 in one or the other direction, pinion 57 turns gear segment 58 whereby plate 47 is pivoted about its axis 48 to one or the other operating position in which the main opening 53 is in alignment with the inlet opening of cutter head 51 or the inlet opening of cutter head 52. In each of these positions, plate 47 may be arrested, by being locked to gear 49, for example, by a spring-loaded ball, not shown.

Although our invention has been illustrated and described with reference to the preferred embodiment thereof, we wish to have it understood that it is no way limited to the details of such embodiments, but is capable of numerous modifications within the scope of the appended claims.

For claim purposes of this application, the definition "lead" includes leads surrounded by a wooden or like skin, such as wooden pencils and plastic coated leads.

Having thus fully disclosed our invention, what we claim is:

1. A pencil sharpener comprising a base, a motor mounted on said base, a pinion fixed to the shaft of said motor, a cover, means removably mounting said cover in fixed position on and with respect to said base, a cutter head journaled in said cover for rotation relatively to said cover about a fixed axis parallel with and offset from the axis of said shaft, a gear fixed with said cutter head coaxially thereof, and directly in mesh with said pinion, and a container for detritus mounted beneath said cutter head.

2. In a pencil sharpener, a base, a motor fixed to said base with its shaft vertically disposed, a pinion fixed to said shaft, a casing secured to said base and enclosing said motor and pinion, there being an enlarged aperture in the top wall of said casing, a cover removably fitting said aperture, a cutter head journaled in said cover for rotation relatively, thereto, about a vertical axis, a gear fixed to said head coaxially therewith and in mesh with said pinion, a container for detritus, and means detachably mounting said container to the underside of said gear beneath said head.

3. A pencil sharpener comprising, casing means, an electric motor fixed in said casing means with its shaft rotatable about a fixed vertical axis, a pinion fixed to the upper end of said shaft, said casing having a top wall, there being an enlarged aperture in said top wall symmetrical about and with respect to a second vertical axis offset from said first axis, a cover removably fitting said aperture, a cutter head journaled in said cover for rotation about said second axis in said casing means, a gear fixed with said head coaxial of said second axis, within said casing, and in mesh with said pinion, a container for detritus within said casing, and means detachably securing said container to the underside of said gear, coaxial of said second axis and beneath said cutter head, said head, gear and container being removable from said casing means, as a unit with said cover through said aperture.

4. In a pencil sharpener, a casing having a top wall, an electric motor fixed within said casing, a pinion in said casing rotatable about a first vertical axis fixed relatively thereto, a driving connection between said motor and pinion, there being an enlarged first aperture through said top wall, a cover removably secured over and closing said first aperture, there being a second aperture through said cover and defining a second axis parallel with and offset from said first axis, cutter head means journaled on and beneath said cover, in said casing, for rotation about said second axis, to secure and sharpen a pencil inserted through said second aperture, and a gear in said casing fixed with said cutter head means coaxially of said second axis and in mesh with said pinion, said cutter head means and gear being removable as a unit with said cover from said casing, through said first aperture.

5. In a pencil sharpener, a casing having a top wall, a motor fixed in said casing with its shaft rotatable about a first vertical axis, a pinion fixed to the upper end of said shaft, there being an aperture in said top wall symmetrical about a second vertical axis offset from said first axis, a cover removably fitting said aperture, a gear and cutter head assembly, means journaling said gear and cutter head assembly on and beneath said cover, in said casing, for rotation about said second axis and with said gear in mesh with said pinion, a bushing rotatably mounted in a second aperture through said cover for rotation about said second axis, and forming a guide for a pencil inserted therethrough into a cutter head of said assembly, a second pinion fixed with said bushing below said cover, a plate mounted on and beneath said gear for pivotal movement about a third axis offset from said second axis, a gear sector fixed with said plate coaxial of said third axis, and in mesh with said second pinion, a lead sharpening head and a pencil sharpening head, both said heads being mounted on said plate, in radially offset relation from and with respect to said third axis, and means fixed with said bushing exteriorly of said casing for manually rotating the bushing to bring a selected one of said heads into alignment with said second axis.

References Cited by the Examiner

UNITED STATES PATENTS

| | | | |
|---|---|---|---|
| 1,494,988 | 5/24 | Boyd | 120—96 |
| 2,520,020 | 8/50 | Sollosy et al. | 120—96 |
| 2,557,646 | 6/51 | Fugle | 120—93 X |
| 2,563,015 | 8/51 | Ewald | 120—92 |
| 2,642,044 | 6/53 | Mussguller | 120—93 |
| 3,004,522 | 10/61 | Kent | 120—96 |
| 3,090,358 | 5/63 | Condon | 120—96 |

FOREIGN PATENTS 753,531   7/56   Great Britain.

JEROME SCHNALL, *Primary Examiner.*

LAWRENCE CHARLES, *Examiner.*